No. 819,280. PATENTED MAY 1, 1906.
T. HUGHES.
SHAFT OILER.
APPLICATION FILED JULY 6, 1905.
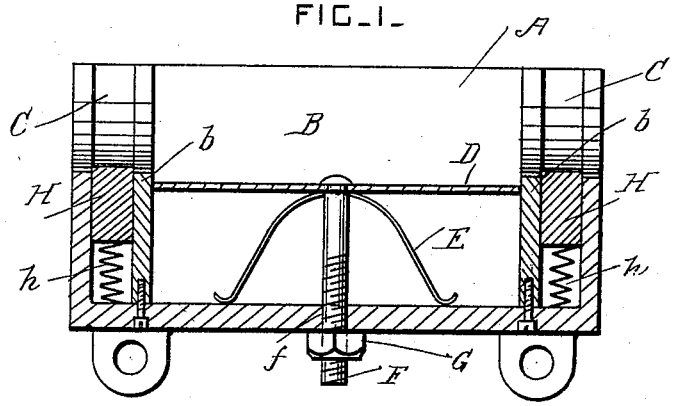
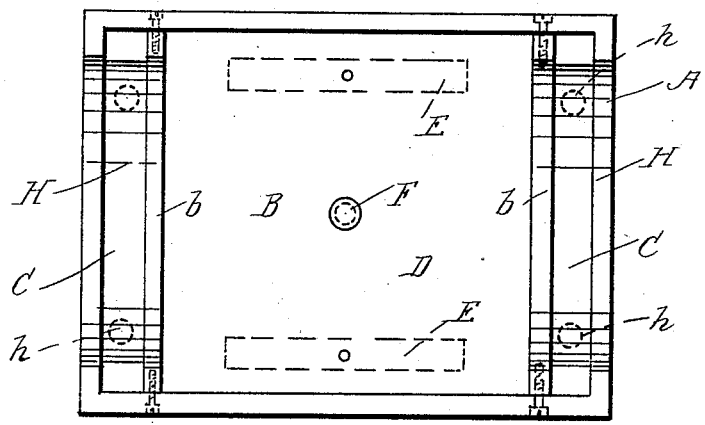
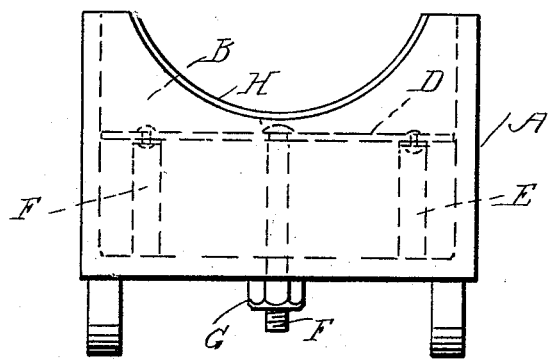
WITNESSES:
Walter Allen
Robt. A. Cinal
INVENTOR
Thomas Hughes
BY
Herbert W. Jenner
Attorney

UNITED STATES PATENT OFFICE.

THOMAS HUGHES, OF EAST SOMERVILLE, MASSACHUSETTS.

SHAFT-OILER.

No. 819,280. Specification of Letters Patent. Patented May 1, 1906.

Application filed July 6, 1905. Serial No. 268,370.

*To all whom it may concern:*

Be it known that I, THOMAS HUGHES, a citizen of the United States, residing at East Somerville, in the county of Middlesex and State of Massachusetts, have invented certain new and useful Improvements in Shaft-Oilers; and I do hereby declare the following to be a full, clear, and exact description of the invention, such as will enable others skilled in the art to which it appertains to make and use the same.

This invention relates to oilers for all kinds of shafts, bearings, and rods, such as piston-rods; and it consists in the novel construction and combination of the parts hereinafter fully described and claimed.

In the drawings, Figure 1 is a longitudinal section through the oiler. Fig. 2 is a plan view of the oiler. Fig. 3 is an end view of the oiler.

A is a rectangular box or chamber provided with partitions $b$ near its ends, thereby forming a large compartment B at the middle part of the box and two narrow compartments C at the ends of the box. These partitions may be formed integral with the box or they may be removable and may be secured in it by any approved means. These partitions and the ends of the box have concave surfaces to suit the shaft or rod to which they are applied.

D is a platen or plate which is slidable in the middle compartment B. The lubricating material is placed in this compartment on the said platen, and the lubricating material may consist of any grease or absorbent material satuated with oil or any other approved lubricant which can be applied to a rod or shaft.

E represents springs under the platen which press the lubricant into contact with the rod or shaft.

F is a regulator for the platen. Any approved regulating mechanism may be used, but a screw is preferably used. This screw is secured to the platen at one end, and its other end portion is slidable in a hole $f$ in the bottom of the box.

G is a regulating-nut on the projecting end of the screw. The nut is screwed up so that the platen is drawn down in the compartment, and the lubricant is then inserted in the upper part of the compartment over the platen.

The device is secured adjacent to the shaft or rod to be lubricated, and the regulator is slacked from time to time, so as to let the spring press the lubricant against the rod or shaft.

H represents wipers, of felt or other approved material, inserted in the end compartments of the box, the lower parts of which are preferably filled with oil. These wipers are pressed against the rod or shaft by springs $h$ underneath them, and they prevent the lubricant spreading along the rod or shaft and prevent dirt from getting into the lubricant.

What I claim is—

1. In an oiler, the combination, with a box divided into three compartments, of dust-guards arranged in the end compartments of the said box, a spring-pressed platen slidable in the middle compartment of the said box, a regulating-screw connected to the said platen and projecting through a hole in the bottom of the said box, and a regulating-nut on the projecting end portion of the said screw.

2. In an oiler, the combination, with a box, of a spring-pressed platen slidable in the said box and supporting the lubricant, a regulating-screw secured to the said platen and projecting through a hole in the bottom of the said box, and a regulating-nut on the projecting end portion of the said screw.

In testimony whereof I have affixed my signature in the presence of two witnesses.

THOMAS HUGHES.

Witnesses:
ALICE J. MURRAY,
FREDK. K. DAGGETT.